United States Patent
Wu et al.

(10) Patent No.: US 12,204,844 B2
(45) Date of Patent: Jan. 21, 2025

(54) SYSTEM FOR DATA DISPLAYING AND OPERATING METHOD THEREOF

(71) Applicants: DIGIWIN CO., LTD., Shanghai (TW); DATA SYSTEMS CO., LTD., New Taipei (TW)

(72) Inventors: Chao-Lin Wu, New Taipei (TW); Guoxin Sun, Shanghai (CN)

(73) Assignees: DIGIWIN CO., LTD., Shanghai (CN); DATA SYSTEMS CO., LTD., New Taipei (TW)

( * ) Notice: Subject to any disclaimer, the term of this patent is extended or adjusted under 35 U.S.C. 154(b) by 0 days.

(21) Appl. No.: 18/366,699

(22) Filed: Aug. 8, 2023

(65) Prior Publication Data

US 2024/0394463 A1   Nov. 28, 2024

(30) Foreign Application Priority Data

May 25, 2023   (CN) .......................... 202310601327.3

(51) Int. Cl.
*G06F 40/106* (2020.01)
*G06F 40/177* (2020.01)
*G06F 40/18* (2020.01)

(52) U.S. Cl.
CPC .......... *G06F 40/106* (2020.01); *G06F 40/177* (2020.01); *G06F 40/18* (2020.01)

(58) Field of Classification Search
CPC .... G06F 40/103; G06F 40/106; G06F 40/189; G06F 40/177; G06F 40/18
See application file for complete search history.

(56) References Cited

U.S. PATENT DOCUMENTS

| | | | | |
|---|---|---|---|---|
| 5,588,099 | A * | 12/1996 | Mogilevsky | G06T 3/40 715/273 |
| 6,055,550 | A * | 4/2000 | Wallack | G06F 40/103 715/229 |
| 2011/0276868 | A1* | 11/2011 | Hoke | G06F 40/103 715/217 |
| 2016/0306778 | A1* | 10/2016 | Kennedy, Jr. | G06F 40/106 |
| 2019/0220530 | A1* | 7/2019 | Motwani | H04L 67/1097 |
| 2019/0392056 | A1* | 12/2019 | Sugeerappa | G06F 16/215 |
| 2021/0133283 | A1* | 5/2021 | Tyagi | G06F 40/18 |

* cited by examiner

*Primary Examiner* — Nicholas Ulrich
(74) *Attorney, Agent, or Firm* — JCIPRNET (57) ABSTRACT

A data displaying system and a data displaying method are provided. The data displaying system includes a storage device and a processor. The processor executes a plurality of modules in the storage device. A collection module accesses a database to retrieve historical display data. The historical display data include a plurality of fields. An analysis module calculates a plurality of length values of the historical display data in the respective fields to generate length data. The analysis module counts a distribution of the length data and generates target field widths corresponding to the fields based on a threshold and the distribution of the length data. An interface module outputs the target field widths to an electronic device, which allows the electronic device to display current display data in the electronic device based on the target field widths and thus improve user experience.

16 Claims, 5 Drawing Sheets

SYSTEM FOR DATA DISPLAYING AND OPERATING METHOD THEREOF

CROSS-REFERENCE TO RELATED APPLICATION

This application claims the priority benefit of China application serial no. 202310601327.3, filed on May 25, 2023. The entirety of the above-mentioned patent application is hereby incorporated by reference herein and made a part of this specification.

BACKGROUND

Technical Field

The disclosure relates to a data displaying system; more particularly, the disclosure relates to a data displaying system and a data displaying method.

Description of Related Art

Users have abilities to operate electronic devices to access a plurality of data from databases. Typically, the data are displayed in the form of tables, while there are two situations that may negatively impact user experience. Firstly, when a length of certain data exceeds a width of a corresponding field in the table, the data are displayed in multiple lines in this field, resulting in line breaks. This may often lead to the users misunderstanding the content of the data. Secondly, when the length of certain data is shorter than the width of the field, it results in unused space or an excessively wide field, which may make it difficult for the users to quickly access the data or understand the content of the data.

Some proposed solutions aim to address the issues by displaying the width of each field in a default table on a displaying system. This helps avoid at least one of the two aforementioned situations. However, since the content of the data varies, the two aforementioned situations may still randomly occur without any improvement. Another approach involves real-time detection of the length of multiple data in real-time through the displaying system, allowing for generation of the maximum width of the fields in the table to prevent the first situation. However, the second situation may still occur frequently.

Other solutions involve calculating a distribution ratio of the lengths of various data in the database in advance through the displaying system, with the goal of designing a displaying method that improves the user experience. However, due to the large quantity of data in the database, significant computational resources are consumed from the displaying system. In addition, since the data in the database change frequently, the distribution ratio generated by the displaying system is prone to failure. Moreover, the generated distribution ratio reflects the lengths of the data but not the actual distribution of the data displayed on the electronic device, thus limiting the effectiveness in enhancing the user experience.

SUMMARY

The disclosure provides a data displaying system capable of improving user experience through reasonable resource utilization.

According to an embodiment of the disclosure, a data displaying system including a storage device and a processor is provided. The storage device stores a plurality of modules. The processor is coupled to the storage device and executes the modules. The modules include a collection module, an analysis module, and an interface module. The collection module accesses a database to retrieve historical display data. The historical display data include a plurality of fields. The analysis module calculates a plurality of length values of the historical display data in the fields to generate length data. The analysis module further counts a distribution of the length data and generates target field widths corresponding to the fields based on a threshold and the distribution of the length data. The interface module outputs the target field widths to an electronic device, so that the electronic device displays current display data in the electronic device based on the target field widths.

According to an embodiment of the disclosure, a data displaying method is provided and includes following steps. A plurality of modules are stored through a storage device. The modules include a collection module, an analysis module, and an interface module. The modules are executed through a processor, and the step of executing the modules includes following steps. A database is accessed through the collection module to retrieve historical display data. The historical display data include a plurality of fields. A plurality of length values of the historical display data in the fields are calculated through the analysis module to generate length data. A distribution of the length data is counted, and target field widths corresponding to the fields is generated based on a threshold and the distribution of the length data through the analysis module. The target field widths are output to an electronic device through the interface module, so that the electronic device displays current display data in the electronic device based on the target field widths.

Based on the above, the data displaying system and data displaying method provided in one or more embodiments of the disclosure may dynamically and effectively obtain the distribution ratio of the target display data length by analyzing the collected historical display data through the analysis module to generate the distribution of the length data in no need of consuming excessive resources to calculate data in the database. In addition, by generating corresponding field widths based on the threshold and the distribution through the analysis module, the electronic device may display the current display data with an appropriate field width, thereby improving the user experience.

Several exemplary embodiments accompanied with figures are described in detail below to further describe the disclosure in details.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Reference will now be made in detail to the embodiments of the disclosure, examples of which are illustrated in the accompanying drawings. Wherever possible, the same reference numbers are used in the drawings and the description to refer to the same or like parts.

Figure 1:
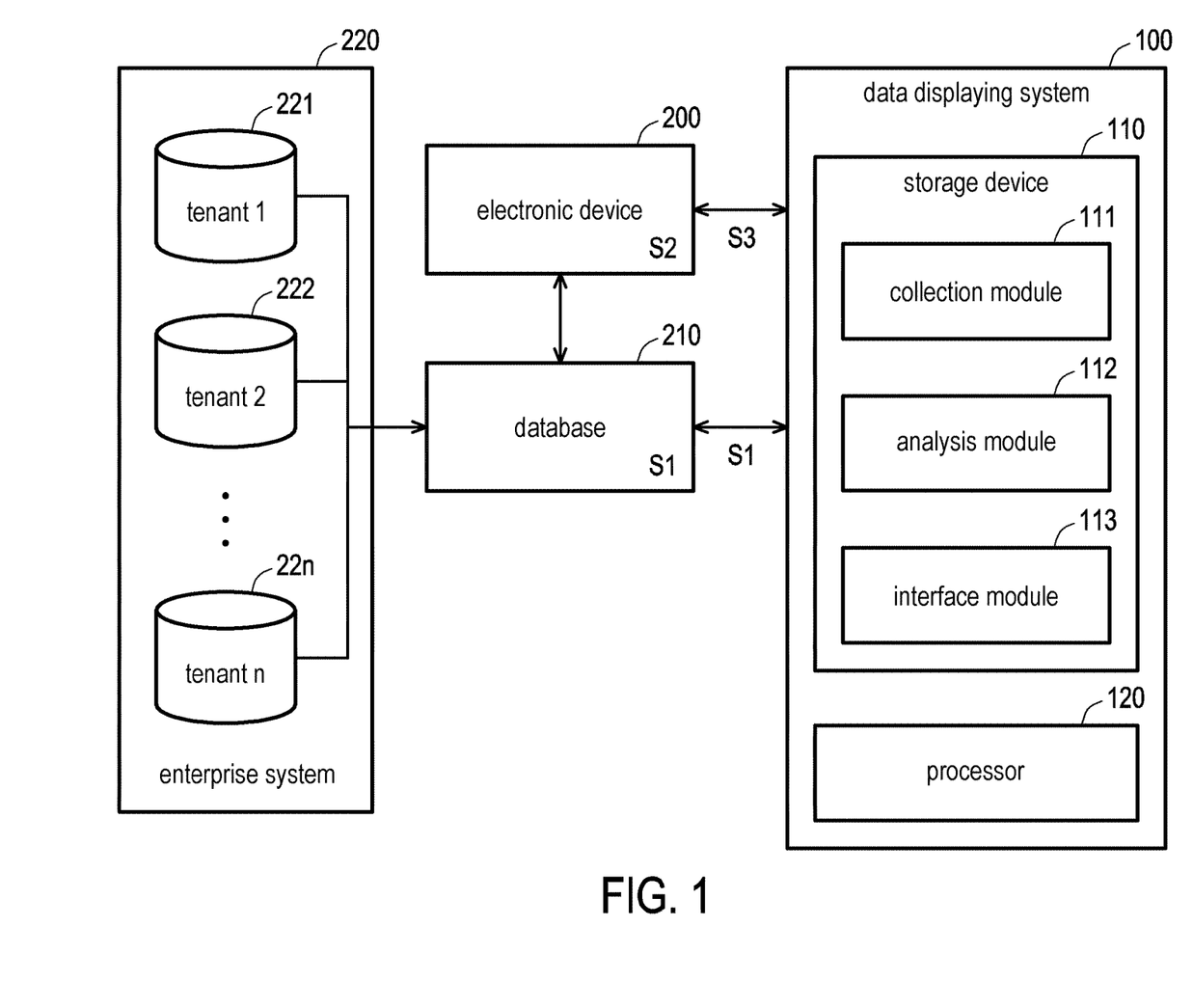
FIG. 1 is a circuit block view illustrating a data displaying system according to an embodiment of the disclosure.

FIG. 1 is a circuit block view illustrating a data displaying system according to an embodiment of the disclosure. With reference to FIG. 1, a data displaying system 100 is coupled to an electronic device 200 and a database 210. The electronic device 200 is coupled to an enterprise system 220 and may operate a user interface to call the data displaying system 100 through an application programming interface (API) and further obtain configuration profile of displaying applications (e.g., target field widths S3) through the data displaying system 100. The electronic device 200 may access the database 210.

In this embodiment, the electronic device 200 may also operate the user interface to call the enterprise system 220 and further execute various business services through the enterprise system 220, so as to allow the electronic device 200 to display various data corresponding to the business services (e.g., historical display data S1 or current display data S2). The enterprise system 200 may be, for instance, an enterprise resource planning (ERP) system. The electronic device 200 may be, for instance, a mobile phone, a tablet computer, a laptop, a desktop computer, and so forth.

In this embodiment, the enterprise system 220 may include a plurality of databases 221-22n for a plurality of tenants, where n is a positive integer. Each tenant's database 221-22n may access application data (e.g., data S1 and S2) corresponding to this tenant in the enterprise system 220. One or more users corresponding to this tenant may access the application data through their respective electronic devices (e.g., the electronic device 200), and the user may further display the application data through the electronic device 200. The application data may be presented, for instance, in the form of a table.

In this embodiment, the database 210 may access a plurality of tenant databases 221-22n. That is, the database 210 may store the application data (i.e., historical display data S1) accessed and displayed on the electronic device 200 once calling the enterprise system 220. In this embodiment, the database 210 may be set in the cloud. In some embodiments, the database 210 may be disposed in the electronic device 200.

In this embodiment, the data displaying system 100 may be set in the cloud, allowing a user to make connections through the electronic device 200 and execute the related business service functions of different APIs (such as the related functions of the ERP system) also set in the data displaying system 100. The data displaying system 100 may be, for instance, a software as a service (SaaS) server, which executes the corresponding SaaS application programs through the APIs. In some embodiments, the data displaying system 100 may be set in the local environment of an enterprise, allowing the user to connect the data displaying system 100 with other systems set in the cloud through the electronic device 200 and input/output data, so as to execute corresponding SaaS application programs through the APIs. In some embodiments, the data displaying system 100 may be integrated with the enterprise system 220.

In this embodiment, the data displaying system 100 may include a storage device 110 and a processor 120. The storage device 110 may store a plurality of modules 111-113. These modules may include a collection module 111, an analysis module 112, and an interface module 113. In this embodiment, the storage device 110 may access the historical display data S1 in the database 210.

In this embodiment, the storage device 110 may further store various algorithms, computational software, and the like for each of the modules 111-113 to achieve the invention, such as algorithms, programs, and data related to data-counting, calling, and various calculations. The storage device 110 may be, for instance, a dynamic random access memory (DRAM), a flash memory, a non-volatile random access memory (NVRAM), or a combination thereof.

In this embodiment, the processor 120 is coupled to the storage device 110. The processor 120 may access the storage device 110 and may execute data in the storage device 110, each of the modules 111-113, and data from the electronic device 200 (e.g., activated use case information S1). In this embodiment, the processor 120 may be, for instance, a signal converter, a field programmable gate array (FPGA), a central processing unit (CPU), or any other programmable general-purpose or special-purpose microprocessor, digital signal processor (DSP), programmable controller, application-specific integrated circuit (ASIC), programmable logic device (PLD), another similar device, or combinations of these devices, which may load and execute computer program-related firmware or software to achieve a data-counting function, a calling function, and various calculations.

Figure 2:
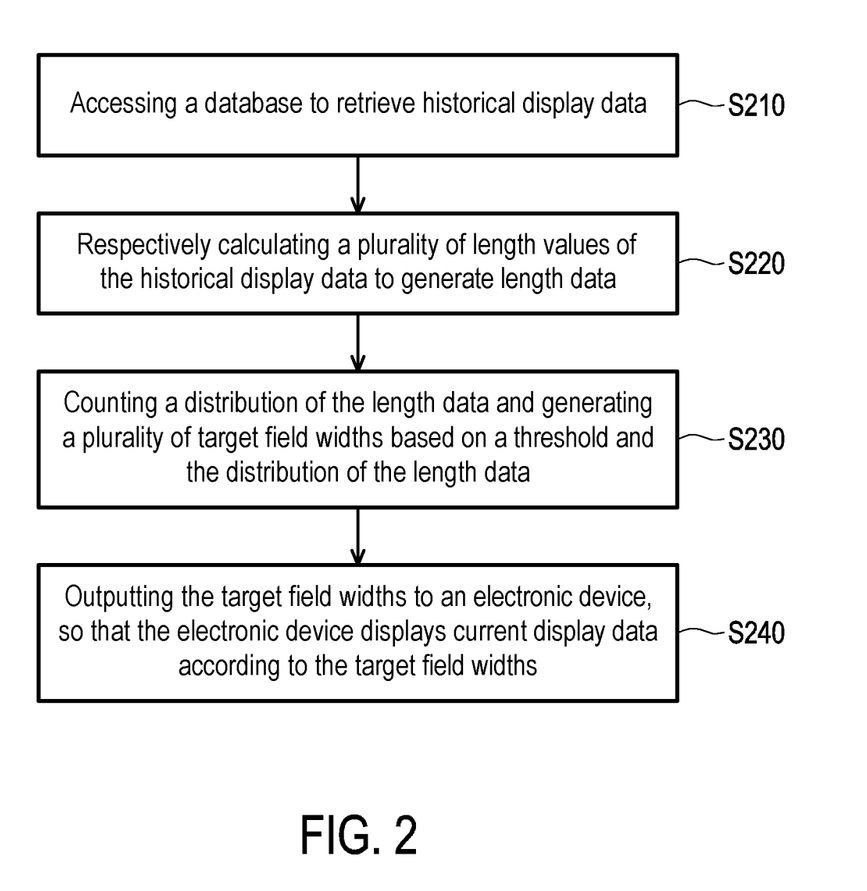
FIG. 2 is a flowchart illustrating a data displaying method according to an embodiment of the disclosure.

FIG. 2 is a flowchart illustrating a data displaying method according to an embodiment of the disclosure. With reference to FIG. 1 and FIG. 2, the data displaying system 100 may execute steps S210-S230, and an order of performing the steps S210-S230 shown in FIG. 2 is merely for illustrative purposes and should not be construed as a limitation in the disclosure.

In step S210, the processor 120 executes the collection module 110, so as to allow the collection module 110 to access the database 210 to retrieve the historical display data S1. In this embodiment, the historical display data S1 may be demonstrated, for instance, in the form of a table and includes a plurality of fields.

In step S220, the processor 120 executes the analysis module 112, so as to allow the analysis module 112 to calculate a plurality of length values of the historical display data S1 in the fields to generate length data. That is, for each field, the analysis module 112 calculates the length value (or number of digits) of the historical display data S1 in the field. The analysis module 112 records these length values corresponding to the fields as the length data (e.g., the length data shown in FIG. 4A).

In step S230, the processor 120 executes the analysis module 112, so as to allow the analysis module 112 to count a distribution of the length data and generate the target field widths S3 corresponding to the fields based on a threshold and the distribution of the length data. In this embodiment, the target field widths S3 may be, for instance, a configuration file provided for system components (e.g., application components in the electronic device 200) to use.

Figure 4A:
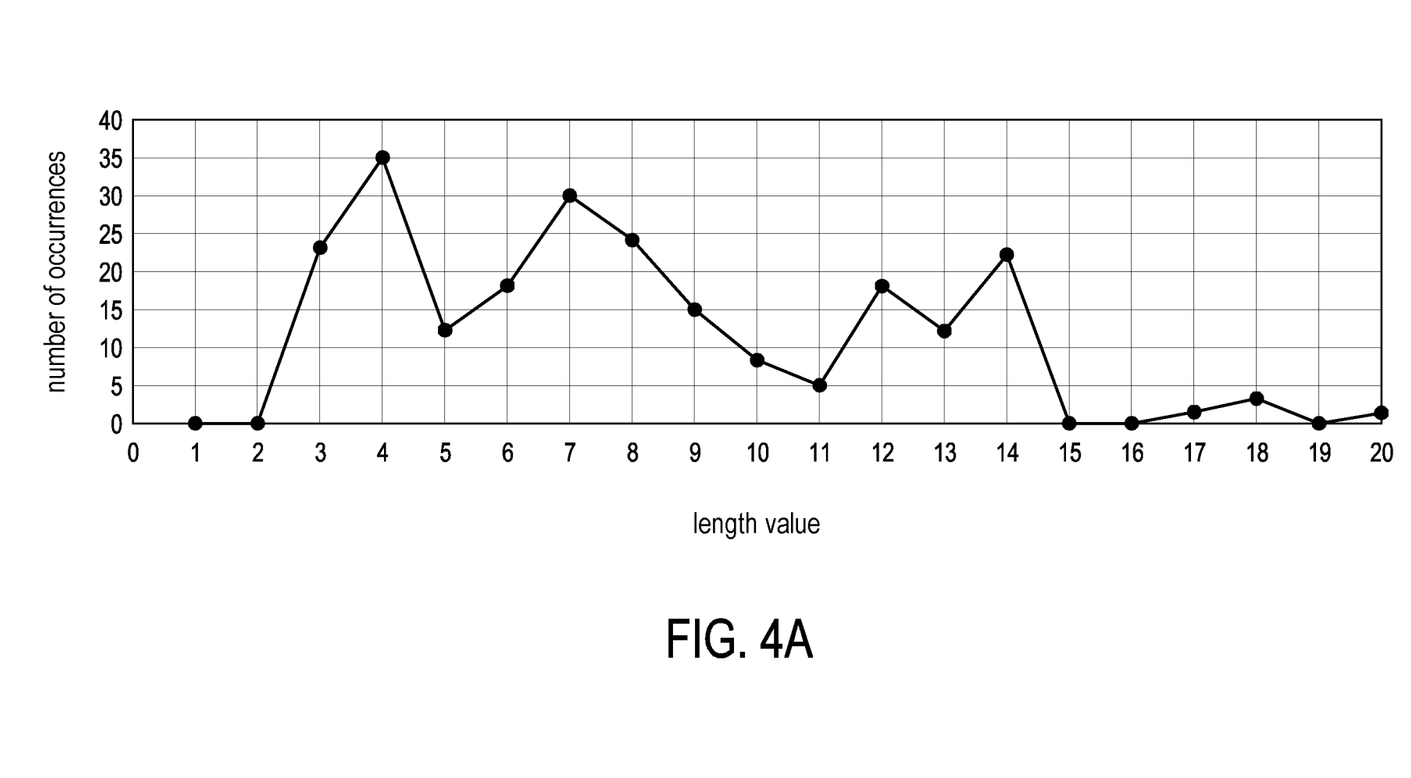
FIG. 4A is a schematic view illustrating the length data provided in the embodiment depicted in FIG. 3.
Figure 4B:
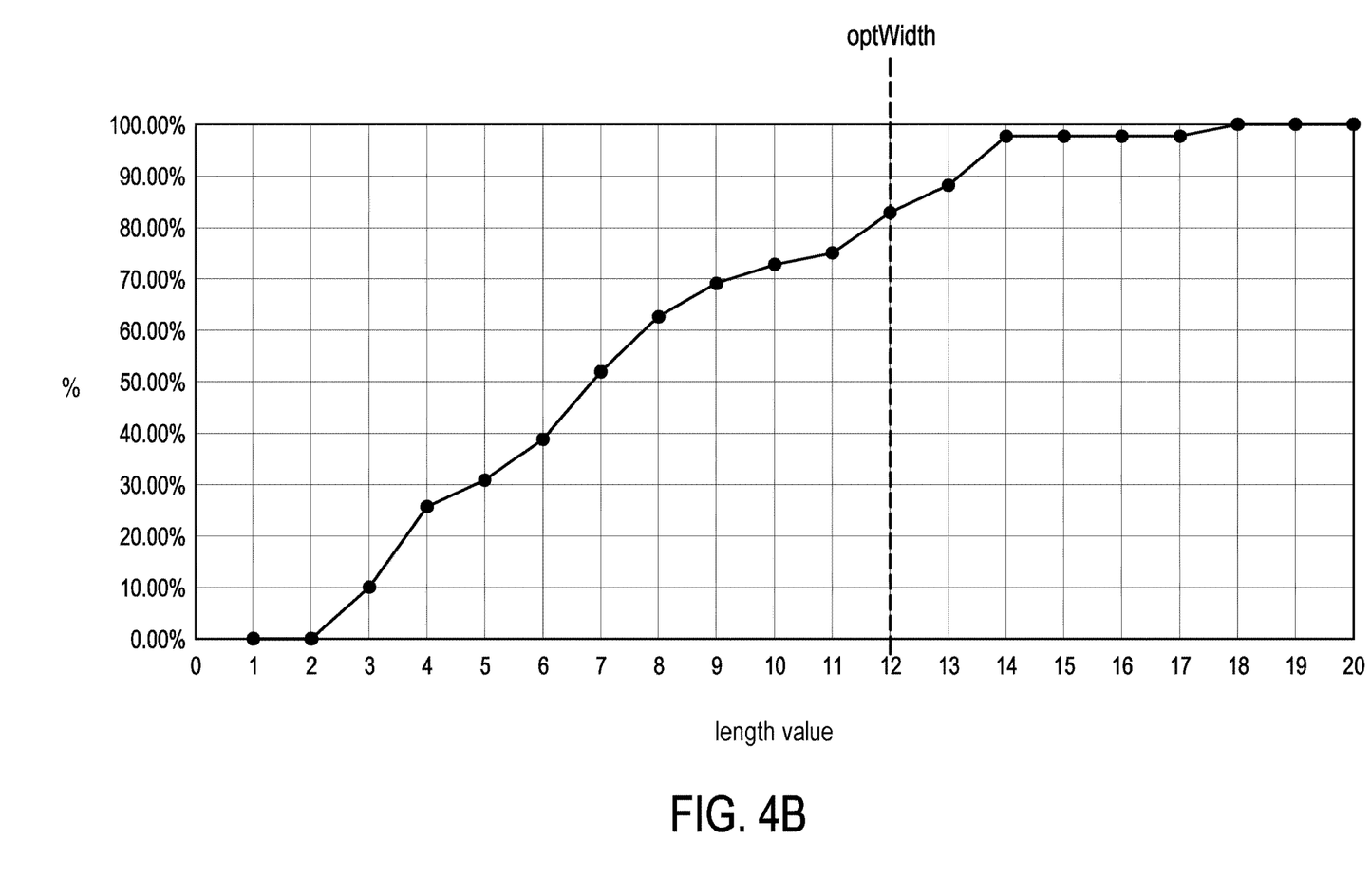
FIG. 4B is a schematic view illustrating a distribution of the length data provided in the embodiment depicted in FIG. 3.

In other words, the analysis module 112 calculates a probability of occurrence of the length value of each historical display data S1 and demonstrates the length values in the form of the distribution of the length data (e.g., the distribution shown in FIG. 4B). For each field, the analysis module 112 calculates an optimal width value of the field based on the threshold and the distribution to ensure there is certain probability (i.e., the threshold) that the data may be demonstrated in an appropriate manner in this field without causing line breaks or leaving significant unused space. The analysis module 112 records the optimal width values corresponding to the fields as the target field widths S3.

In step S240, the processor 120 executes the interface module 113, so as to allow the interface module 113 to output the target field widths S3 to the electronic device 200, whereby the electronic device 200 displays the current display data S2 in the electronic device 200 according to the target field widths S3. In other words, when the analysis module 112 completes the counting step and sets the target field widths S3 accordingly, the interface module 113 outputs the target field widths S3 to the electronic device 200, and thereby the user is enabled to display the current data S2 on the electronic device 200 based on the configuration file (i.e., the target field widths S3). In some embodiments, the interface module 113 outputs the target field widths S3 to the database 210, so that the user may access the database 210 through the electronic device 200 to obtain the target field widths S3.

By counting the collected historical display data S1 through the analysis module 112, note that calculations may be performed based on the data previously displayed on the electronic device 200 without consuming excessive resources to calculate the databases 221-22n of the tenants included in the enterprise system 220. In addition, by generating the target field widths S3 according to the threshold and the statistical distribution through the analysis module 112, there is a certain probability that the fields in the user interface are presented in an appropriate manner. As such, with the reasonable resource utilization, the data displaying system 100 may dynamically and effectively obtain the distribution ratio of the length of the historical display data S1 and provide the target field widths S3 accordingly, so that the electronic device 200 displays the current display data S2 with an appropriate field width, thereby improving the user experience.

Figure 3:
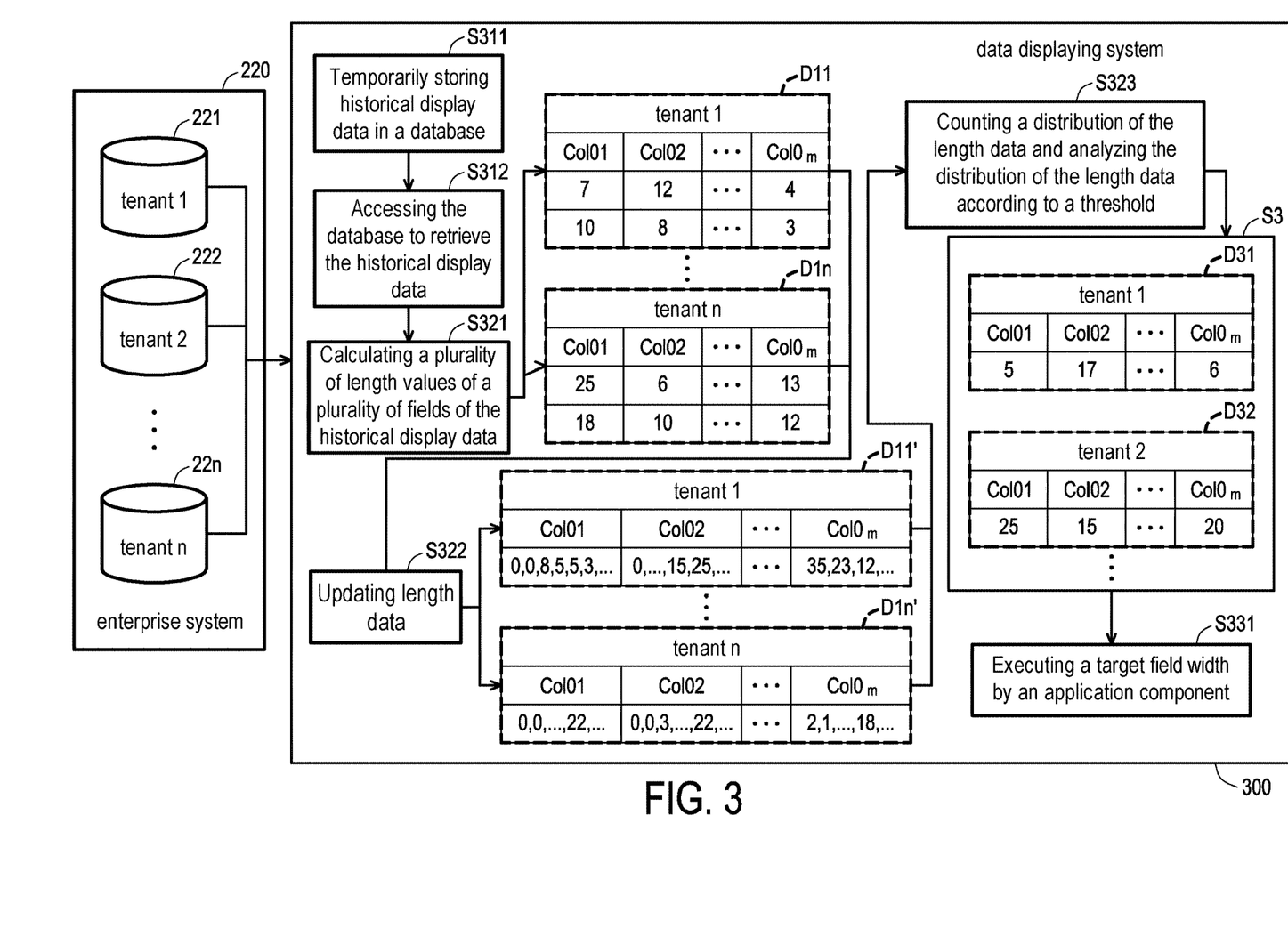
FIG. 3 is a schematic view illustrating an operation of a data displaying system according to an embodiment of the disclosure.

With reference to FIG. 3, a data displaying system 300, the enterprise system 220, a database (e.g., the database 210 shown in FIG. 1), and the electronic device 200 (e.g., the database 200 shown in FIG. 1) may collaborate to achieve the function of optimizing the field width by executing modules S311-S342, and the implementation details of FIG. 2 may be exemplified below. The descriptions of the data displaying system 300, the enterprise system 220, the database 210, and the electronic device 200 may be referred to as and derived from the relevant descriptions of the data displaying system 100 above.

In the module S311, the electronic device 200 operates the enterprise system 220 to temporarily store the historical display data S1 in the database 210. In detail, whenever the electronic device 200 calls the enterprise system 220 to display data, the display data are temporarily stored (e.g., asynchronously stored) in the database 210.

In this embodiment, the database 210 may be implemented, for instance, in form of Kafka or a general database. In this embodiment, the database 210 may temporarily store the historical display data S1 as the current display data S2 shown in FIG. 1. The database 210 may further store results (e.g., length data D11'-D1n') obtained after analyzing the historical display data S1. In the module S312, the data displaying system 300 (e.g., the collection module 111) accesses the database 210 to retrieve the historical display data S1. In this embodiment, the fields included in the historical display data S1 correspond to the historical display data of the databases 221-22n of the tenants, respectively. That is, the historical display data S1 may include a plurality of tables, and each table includes a plurality of fields and records the application data accessed and displayed by one single tenant who has called the enterprise system 220, and the application data may be stored in the tenant's database (e.g., the database 221). The module S312 may, for instance, refer to the implementation details of the step S210 shown in FIG. 2.

In this embodiment, the data displaying system 300 (e.g., the collection module 111) may access the database 210 to update the historical display data S1 according to a set period. The set period may be, for instance, a preset period generated by the user calling the data displaying system 300 in advance. That is, the data displaying system 300 collects data from the database 210 at specific times or periodically to update the historical display data S1.

In the module S321, the data displaying system 300 (e.g., the analysis module 112) calculates the length values of the fields of the historical display data S1 to generate length data D11-D1n. That is, after the data displaying system 300 retrieves the historical display data S1 from the database 210, the data displaying system 300 calculates the length values of the fields corresponding to different tenants in the historical display data S1 to access the length data D11-D1n.

In this embodiment, the length data D11 may be, for instance, the length data calculated based on the historical display data S1 of a tenant 1. The length data D11 may be presented in a table, for instance. The length data D11 may include data, such as a first length value (represented by "7") corresponding to first data and a second length value (represented by "10") corresponding to second data in a first field (represented by "Col01"), a third length value (represented by "12") corresponding to third data and a fourth length value (represented by "8") corresponding to fourth data in a second field (represented by "Col02"), and so on. The length data D1n may be, for instance, the length data calculated based on the historical display data S1 of a tenant n, and the length data D1n may be deduced from the relevant description of the length data D11.

In the module S322, the data displaying system 300 (e.g., the analysis module 112) counts the number of occurrences of the length data D11-D1n in the fields to update the length data D11-D1n to length data D11'-D1n'. In other words, after the data displaying system 300 converts the data in the fields into the length data D11-D1n, the data displaying system 300 counts the number of occurrences of the length data DU-Din in the corresponding fields and demonstrates the length data D11-D1n as the length data D11'-D1n'. The modules S321-S322 may, for instance, refer to the implementation details of the step S220 shown in FIG. 2.

In this embodiment, the length data D11' may be, for instance, a distribution of the length values calculated based on the length data D11 corresponding to the tenant 1. The length data D11' may be presented in a table, for instance. The length data D11' may include, for instance, the number of occurrences (represented by vectors "0, 0, 8, 5, 5, 3, ... ") of the length values in the first field (represented by "Col01") and the number of occurrences (represented by the vector "0, . . . , 15, 25, . . . ") of the length values in the second field (represented by "Col02"). The length data D1n' may be referred to as and derived from the relevant description of the length data D11'.

Please refer to FIG. 4A, which is a schematic view illustrating the length data provided in the embodiment depicted in FIG. 3. In this embodiment, the length data D11' may be shown in a distribution chart. In FIG. 4A, a horizontal axis represents the length value, and a vertical axis represents the number of occurrences. The data displaying system 300 respectively counts the number of occurrences of the data having various length values appear in each field.

In the module S323, the data displaying system 300 (e.g., the analysis module 112) counts the distribution of the length data D11'-D1n' and analyzes the distribution of the length data D11'-D1n' according to the threshold to generate the target field widths S3. In other words, for the length data D11'-D1n' of each of the tenants, the data displaying system 300 counts a cumulative distribution of the length data D11'-D1n' to generate a distribution result. The data displaying system 300, based on the threshold, finds the length data (e.g., the target length) with a probability of occurrence that satisfies the threshold from the distribution result and accordingly generates the corresponding field width. In this embodiment, the threshold may be, for instance, a default value generated by the user calling the data displaying system 300 in advance. The module S323 may, for instance, refer to the implementation details of the step S230 shown in FIG. 2.

Please refer to FIG. 4B, which is a schematic view illustrating a distribution of the length data provided in the embodiment depicted in FIG. 3. In this embodiment, the distribution of the length data D11'-D1n' is the cumulative distribution of the length data D11'-D1n'. In FIG. 4B, a horizontal axis represents the length value, and a vertical axis represents a percentage of the cumulative number of occurrences (i.e., the probability of occurrence). The data displaying system 300 counts and accumulates the probability of occurrence of the data having various length values in all fields.

A threshold of 80% is taken as an example. In this embodiment, the data displaying system 300 (e.g., the analysis module 112) selects the length data D11'-D1n' having the cumulative distribution value greater than or equal to the threshold (e.g., 80%) from the distribution of the length data D11'-D1n' shown, for instance, in FIG. 4B. The selected length data D11'-D1n' (e.g., the length value represented as "12") is selected as a target length optWidth. The data displaying system 300 (e.g., the analysis module 112) then converts the target length optWidth into a corresponding width value in the target field widths S3.

Note that the field width set based on the threshold (e.g., 80%) allows the data displayed on the user interface to be presented in a most appropriate manner without causing line breaks according to the proportion (e.g., 80%). As such, based on the threshold (e.g., 80%), the situations of causing line breaks or leaving significant unused space are limited to a certain proportion or below (e.g., 100%-80%, i.e., 20%).

In this embodiment, when a total quantity of the length data D11'-D1n' is less than a data quantity threshold (e.g., 10,000), the data displaying system 300 (e.g., the analysis module 112) maintains the field width of the fields corresponding to the length data D11'-D1n'. That is, the analysis module 112 maintains the original field widths and further outputs the field widths as the target field widths S3.

When the quantity of the length data D11'-D1n' is insufficient (e.g., less than 10,000), note that the analysis module 112 maintains the original field widths of the length data D11'-D1n' and outputs the original field widths as the target field widths S3. On the other hand, when the quantity of the length data D11'-D1n' is sufficient, the analysis module 112 sets the target length optWidth of the length data D11'-D1n' based on the threshold (e.g., 80%) and outputs the target length optWidth as the target field widths S3.

In this embodiment, the target field widths S3 may include a plurality of width data D31-D3n. The width data D31, for instance, may be current optimal width data calculated based on the distribution of the length data corresponding to the tenant 1. The width data D31 may be presented in a table, for instance. The width data D31 may include data, such as a first width value (represented as "5") corresponding to the first field (represented as "Col01") and a second width value (represented as "17") corresponding to the second field (represented as "Col02"). In other words, in the first field (represented as "Col01"), when the width value of 5 is applied to set to display data, there is a probability (e.g., 80%) that the display data in the first field are presented in an appropriate manner. The width data D32, for instance, may be currently optimal width data calculated based on the distribution of the length data corresponding to a tenant 2. The width data D32 may be referred to as and deduced from the relevant description of the width data D31.

In this embodiment, the data displaying system 300 (e.g., the analysis module 112) may re-execute the modules S321-323 based on the updated historical display data S1 and the threshold according to the set period, so as to output the latest target field width S3 and accordingly update the target field widths S3. In other words, the data displaying system 300, at specific times or periodically, may perform calculations related to the analysis module 112 based on the latest historical display data S1 to update the target field widths S3.

In the module S331, the data displaying system 300 (e.g., the interface module 113) outputs the target field widths S3 to the electronic device 200. The application component in the electronic device 200 executes the target field widths S3 to display the current data (e.g., the current display data S2 shown in FIG. 1) in the user interface with a set width value indicated by the target field width S3. In this embodiment, the electronic device 200 displays the current display data S2 in the electronic device 200 according to the target field width S3 corresponding to one of the tenants (e.g., the tenant 1). The module S331 may, for instance, refer to the implementation details of the step S240 shown in FIG. 2.

To sum up, the data displaying system and the data displaying method provided in one or more embodiments of the disclosure may prevent the excessive consumption of the computational resources by collecting the historical display data which are displayed in various fields by each user and temporarily stored in the database through the collection module. By executing a modeling analysis through the analysis module to detect the length data of the historical display data and analyzing the distribution of the length data based on a set ratio (i.e., the threshold), the distribution ratio of the target display data length may be obtained dynamically and effectively. On the condition that the quantity of the length data is sufficient, the target field widths may be output to the electronic device through the interface module, which enables the electronic device to display the current display data with an appropriate field width and accordingly improve the user experience.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A data displaying system, comprising:
   a storage device, storing a plurality of modules; and a processor coupled to the storage device and executing the modules, wherein the modules comprise a collection module, an analysis module, and an interface module, wherein the collection module accesses a database to retrieve historical display data, wherein the historical display data comprise a plurality of fields, wherein the analysis module calculates a plurality of length values of the historical display data in the fields to generate length data, and the analysis module counts a distribution of the length data and generates target field widths corresponding to the fields based on a threshold and the distribution of the length data, wherein the interface module outputs the target field widths to an electronic device, so that the electronic device displays current display data in the electronic device based on the target field widths, wherein the distribution of the length data is a cumulative distribution of the length data.

2. The data displaying system according to claim 1, wherein the database temporarily stores the historical display data from an enterprise system, and the enterprise system is coupled to the electronic device.

3. The data displaying system according to claim 1, wherein the fields correspond to the historical display data of a plurality of tenants in an enterprise system, respectively.

4. The data displaying system according to claim 3, wherein the electronic device displays the current display data based on the target field width corresponding to one of the tenants.

5. The data displaying system according to claim 1, wherein the analysis module selects the length data having a cumulative distribution value greater than or equal to the threshold as a target length from the distribution of the length data and converts the target length into the target field width.

6. The data displaying system according to claim 5, wherein when a total quantity of the length data is less than a data quantity threshold, the analysis module maintains a field width of the fields corresponding to the length data and outputs the field width as the target field width.

7. The data displaying system according to claim 1, wherein the collection module accesses the database to update the historical display data according to a set period.

8. The data displaying system according to claim 7, wherein the analysis module updates the target field widths based on the updated historical display data and the threshold according to the set period.

9. A data displaying method comprising:

storing a plurality of modules through a storage device, wherein the modules comprise a collection module, an analysis module, and an interface module; and executing the modules through a processor, comprising:

accessing a database through the collection module to retrieve historical display data, wherein the historical display data comprise a plurality of fields;

calculating a plurality of length values of the historical display data in the fields through the analysis module to generate length data;

counting a distribution of the length data and generating target field widths corresponding to the fields based on a threshold and the distribution of the length data through the analysis module; and outputting the target field widths to an electronic device through the interface module, so that the electronic device displays current display data in the electronic device based on the target field widths, wherein the distribution of the length data is a cumulative distribution of the length data.

10. The data displaying method according to claim 9, further comprising: temporarily storing the historical display data from an enterprise system by the database, wherein the enterprise system is coupled to the electronic device.

11. The data displaying method according to claim 9, wherein the fields correspond to the historical display data of a plurality of tenants in an enterprise system, respectively.

12. The data displaying method according to claim 11, further comprising: displaying the current display data by the electronic device based on the target field width corresponding to one of the tenants.

13. The data displaying method according to claim 9, wherein the step of counting the distribution of the length data and generating the target field widths corresponding to the fields based on the threshold and the distribution of the length data comprises:

selecting the length data having a cumulative distribution value greater than or equal to the threshold as a target length from the distribution of the length data through the analysis module; and converting the target length into the target field width through the analysis module.

14. The data displaying method according to claim 13, wherein the step of counting the distribution of the length data and generating the target field widths corresponding to the fields based on the threshold and the distribution of the length data comprises:

maintaining a field width of the fields corresponding to the length data through the analysis module when a total quantity of the length data is less than a data quantity threshold; and outputting the field width as the target field width through the analysis module.

15. The data displaying method according to claim 9, wherein the step of accessing the database to retrieve the historical display data comprises:

updating the historical display data by accessing the database according to a set period through the collection module.

16. The data displaying method according to claim 15, wherein the step of counting the distribution of the length data and generating the target field widths corresponding to the fields based on the threshold and the distribution of the length data comprises:

updating the target field widths based on the updated historical display data and the threshold according to the set period through the analysis module.

* * * * *